May 22, 1962   F. J. DAMA ET AL   3,035,568
PORTABLE BAKING DEVICE
Filed Feb. 14, 1957
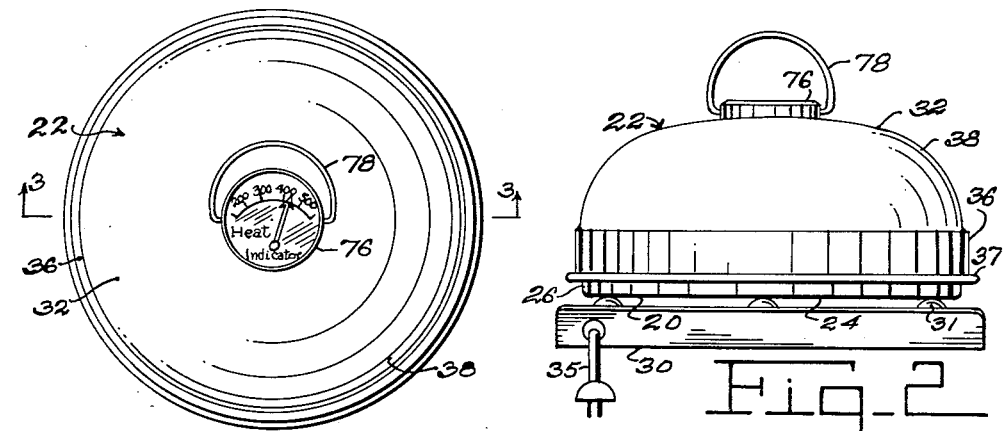
Fig. 1
Fig. 2
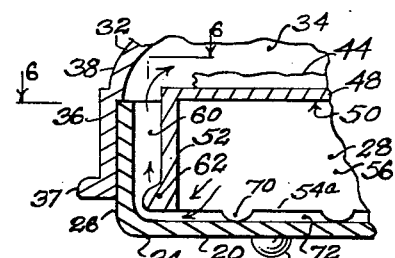
Fig. 5
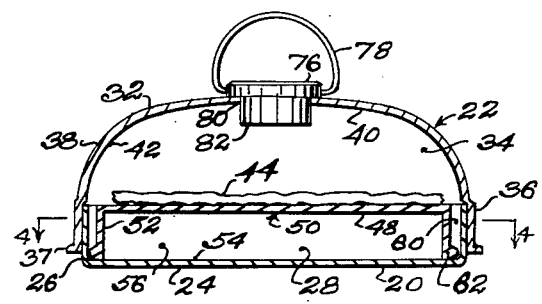
Fig. 3
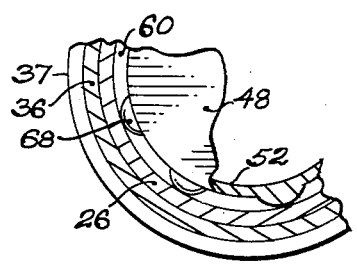
Fig. 6
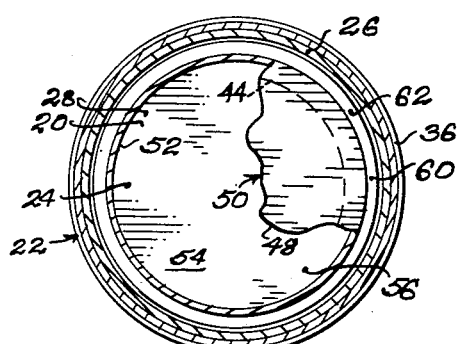
Fig. 4
INVENTORS
Frank J. Dama
Andrew Virga
BY
*Peter Fries, Jr.*
ATTORNEY – # United States Patent Office 3,035,568
Patented May 22, 1962

3,035,568
PORTABLE BAKING DEVICE
Frank J. Dama, 1418 Deer Ave., Panama City, Fla., and Andrew Virga, 1652 Castle Hill Ave., New York, N.Y.
Filed Feb. 14, 1957, Ser. No. 640,242
1 Claim. (Cl. 126—275)

This invention relates to improvements in baking devices and the like.

An object of the invention is to provide a novel and improved baking device, which is relatively portable and light in weight, so that it may be employed with any convenient source of heat, and may be carried thereto as needed.

Another object of the invention is to provide a novel and improved portable baking device in which there is a main housing defining a main chamber for the reception of the article of food to be baked therein, with means for absorbing the heat from the heat source, gas flame, charcoal grill fire, or the like, and for bringing said heat into proper influence on the goods being baked, with the desired and necessary degree of uniformity of temperature, for optimum baking results.

A further object of the invention is to provide a novel and improved portable baking oven device which is adapted to be placed upon a suitable heat source, and includes a dome-shaped upper main housing defining an inner main chamber, with a lower housing adapted for seating on the heat source, stove or the like, and including means for forming a mass or blanket of highly heated air the thickness of the mass being sufficient so as to provide substantially uniform temperatures all over its upper surface and thus through the roof wall enclosing the air mass blanket, with peripheral hot air passages defined at the outer portions of the casing enclosing the air blanket, for conducting uniformly heated air up into the dome, so that when an article of food or pie to be baked is placed upon the said roof wall to derive uniform heat from the air blanket mass below, it also is subjected to similarly highly heated uniform air heat from the dome thereabove, with optimum baking results.

Still another object of the invention is to provide a novel and improved portable baking oven which is particularly advantageous in baking pizza pie crust, and pizza pies, in the home, on a picnic, or other outdoor activity, with the utmost of convenience, and certainty of the best results, the device being provided with a convenient heat indicator giving the exact baking temperature, and convenient handle means for handling the hot cover dome member.

Still a further object of the invention is to provide a novel and improved portable baking oven of the type described, which is simple in design, made of few parts, which is easily taken apart for cleaning, and which is very rugged in use, and may be made at low cost for distribution to the domestic users particularly.

These and other objects and advantages of the invention will become apparent from the following description of a preferred embodiment thereof, as illustrated in the accompanying drawings, forming a part hereof, and in which, FIGURE 1 is a top plan view of the portable baking device shown in FIGURE 2.

FIGURE 2 is a front elevational view showing the baking device in FIGURE 1, with the dome cover element in position.

FIGURE 3 is a transverse sectional elevational view taken substantially on plane 3—3 of FIGURE 1, and indicating in broken lines a pizza pie in baking position therein.

FIGURE 4 is a sectional plan view taken substantially on plane 4—4 of FIGURE 3, the view being partly broken out to further illustrate its construction.

FIGURE 5 is a detail enlarged view similar to that of FIGURE 3, in fragment, and showing modifications in structure.

FIGURE 6 is a fragmentary sectional plan view taken substantially on the irregular plane 6—6 of FIGURE 5, and showing modifications in structure.

In connection with the production of baked goods, the oven itself plays an increasingly important part from the viewpoint of obtaining the best possible results. Where the baked goods are relatively flat, such as in baking pizza pie crust, or pizza pies, it has been found that unfortunate results may be encountered when all the important factors have not been taken into account. Thus, where the pizza pie to be prepared is not subjected to uniform baking temperature all over its lower and upper surfaces, difficulty may ensue in obtaining uniformity in the appearance, taste, and crispness of the baked product. The problems become even more evident when the pizza pie is to be baked complete, that is, with the sauce, seasoning, and cheese or other dressing carried on the upper surface of the dough which is to form the crust.

The present device forms a portable oven or baking device, which may be used by the householder who may be relatively inexperienced in this baking art, yet with a high degree of success. In order to understand clearly the nature of the invention, and the best means for carrying it out, reference may be had to the drawings, in which like numerals denote similar parts throughout the several views.

FIGURES 1 to 4 show the unit in assembled form, there being a major lower element 20 surmounted by a major upper dome element 22. The major lower element 20 includes a bottom heat receiving plate or wall 24, with upstanding skirt wall 26 integral therewith, and extending upwardly from the outer marginal edge thereof, to define an inner upwardly open main chamber 28.

The major lower element which is shown at 20, is adapted to rest upon a source of heat 30, which may be a gas flame and burner, electric hot plate or stove, or the like, or even an outdoor brazier or charcoal fired grill. It is seen that the major lower element 20 is made of substantial area, so as to overlie a good portion of the heat source 30, and thus to receive most of the heat therefrom for conveyance into the interior chamber 28 of the device.

We provide a major upper dome element 22, which is formed of a metallic roof wall 32, which extends across the dome chamber 34, and is integrated with the downwardly extending dome skirt walls 36, the contours of which walls 36 is such as to fit closely though releasably with the contour of the upstanding skirt wall 26 of the main lower element 20. The roof wall 32 is curved as at 38 to provide not only a smoothly contoured inner surface as seen best in FIGURES 2 and 3, but also to provide a highly polished inner reflective surface as at 40 and 42 to reflect the heat downwardly upon the pizza pie or pizza pie crust 44 from above, as seen best in FIGURE 3, with a high degree of efficiency. The pizza pie or baked product in pre-baked form 44, or in partly baked form, as explained herein, is in turn supported above the floor wall 24 of the major lower element 20, upon the inner major platform wall 48 of the inner baffle member 50. From FIGURES 3 and 4, it is seen that the inner baffle member 50 has its platform wall 48 supported upon the peripheral skirt wall 52, which rests upon the upper surface 54 of the major lower element 20. It is clear that there is thus formed under the platform wall 48, a chamber 56, for the reception of a heated mass of air or the like, directly over and in heat exchange contact with the heat receiving floor wall 24 of the major lower element 20.

As a result, the platform 48 does not find itself heated directly from the heat source 30, such as the hot plate, gas flame, or charcoal burner, but rather is secondarily heated from the hot mass of air in the chamber 56. The chamber 56 in turn is of substantial height, to permit of uniform thickness of the hot air mass in chamber 56, and hence, while the air is quite hot, there are no unwanted hot spots or areas on the platform 48, for the hot air cannot develop such hot spots even when heated to a high degree of temperature, such as 450 degrees Fahrenheit or more. The lower surface of the pizza pie dough 4 is hence never subjected to undue localized heating which might make it bake non-uniformly, or burn or otherwise harm it in local areas.

From FIGURES 3 and 4, it is seen that the platform major member 50 has its skirt wall 52 spaced from the skirt wall 26 of the lower major assembly unit 20, as indicated by the annular space or hollow area 60 therebetween, which communicates with the upper inner dome hollow area 34, and it is also shown that there is an annular or even fragmentary radially outstanding rim or bead portion 62 on the skirt 52 of the platform member 50, to maintain this spacing hollow area at 60. As shown further in FIGURE 5, it is seen that the lower edge of the skirt 52 of the platform member 50 is not closely interfitting with the surrounding metal of the contiguous plate 24 or wall 26 of the lower main assembly 20, to allow air which is trapped in the heating chamber 56 to escape or expand into the dome chamber 34 when it is sufficiently heated. Usually, the expected irregularities in manufacture of the platform member 50, and the lower assembly member 20, will provide sufficient mismatch so as to provide leakage paths for hot air to leak out of the chamber 28 around the lower edge of the skirt wall 52, and up through the space 60 into the dome chamber 34. However, to enhance this leakage of heated air from chamber 28 into dome chamber 34, small beads or dimples 70 may be formed in the lower edge of the skirt 52, and undulations 68 in the bead 62, to allow air to leak readily therefrom on being heated suitably and expanding in chamber 28.

This will provide for good heating effect on top of the pizza crust, dough or product 44 as well as heating from below. It has been found that a good pizza pie should be subjected to uniform heat applied not only from below, but from above, and at a good temperature, such as about 450 degrees F., or thereabouts, depending upon the mix, thickness, etc. In FIGURE 5, the arrows indicate paths of air leakage from chamber 56, around the lower edge 54a of the element 52, and up through space 60, into the upper heating chamber 34.

In order to gauge the temperature of the chamber 34, we provide suitable temperature indicating or sensing means 82, which may have a reduced housing portion seated firmly in the opening 80 formed through the dome wall 32, so as to be securely engaged therewith. A handle 78 permits of lifting the entire assembly unit 22 with its temperature gauge 82, to expose the interior chamber portion 34 and hence the pizza pie or other product 44, the fit between elements 36 and 26 being preferably a slip fit, close but not binding, to permit easy lifting off of the dome 32. As seen best in FIGURE 1, the temperature gauge element 82 may have a dial graduated in degrees of temperature, Fahrenheit or centigrade, with a movable needle pointer, carried by a bi-metal coiled heat sensing element of any well known construction in housing 82 and opening on chamber 34, to turn the needle to indicate the actual temperature. The user may thus regulate the heat source 30 on which the device is placed, as in FIGURE 2, by means of any switching or other heat control means regulating the same, or by pulling out the connecting plug 35 if electric hot plate, and too hot. The heat source 30 may have spacer projections 31 as in FIGURE 2, on its top surface, to more efficiently heat the bottom 24, and to allow air to circulate thereunder as desired.

According to a modified form, the dome member 22 may be so constructed as to latch onto the wall 26 of the lower main member 20, to permit lifting the entire unit with the dome and the member 20 off the stove at a time by handle 78, this being accomplished by merely mounting a pair of spring fingers on the wall 26, with their outer resilient ends springably engageable over the bead 36 of the dome member 22, the spring fingers being made so that they can be pulled outwardly for release, for example. Other modes of releasable attachment may also be employed for this purpose when desired. Similarly, according to a modified form of the invention, a window may be formed in dome 22, of transparent heat resistant glass or the like, to permit of inspection of the pizza pie or other baked product inside chamber 34, to determine how it is baking, and when it is ready. As seen in FIGURE 5, according to a modified form, the bottom wall 24 may have several supporting feet or the like 86 secured thereto, to maintain the desired degree of spacing from any heat source on which it is placed. This serves as a heat tempering means, blocking direct impact of heat from an electric hot plate for example, on the device too quickly, and also not only allows the unit to cool off when the heat is removed, but avoids marring a surface when placed thereon.

Although we have described our invention in specific terms, it will be understood that various changes may be made in size, shape, material and arrangement without departing from the spirit and scope of the invention as claimed.

We claim:

A baking device comprising downwardly closed lower housing means, said lower housing means comprising an upwardly dished housing body with an outer skirt wall, to define an upwardly open lower chamber portion, upper housing means engaging said lower housing means to enclose from above said chamber portion and defining a chamber extension thereabove, and inner casing means disposed in said lower housing means and comprising a downwardly dished rounded casing body with an imperforate upper roof wall forming a baking product support plate and an outer continuous skirt wall depending from said support plate and extending downwardly into said lower housing means and positioned inwardly of said lower housing means outer skirt wall to partition a lower portion of said lower housing means to define a hot air chamber of substantial lateral and elevational extent for the reception of air to be heated and to constrain said heated air therein, and spaced bead and undulation spacing means carried by said skirt wall of said inner casing means for spacing the same from said housing body and for defining leakage passages therebetween, whereby, upon expansion of said heated air in said hot air chamber, the same leaks through said leakage passages past abutting walls at the lower portion of said skirt wall of said inner casing means, into said main chamber extension above said baking product support plate, whereby baking products placed on said baking product support plate and in said chamber extension, are subjected to baking heat both from said air in said hot air chamber, and also to heat from heated air in said chamber extension which has leaked therein.

References Cited in the file of this patent

UNITED STATES PATENTS

| 111,850 | James | Feb. 4, 1871 |
| 578,059 | Hallas | Mar. 2, 1897 |
| 875,310 | Ayer | Dec. 21, 1907 |
| 996,087 | Jeavons et al. | June 27, 1911 |

(Other references on following page)

UNITED STATES PATENTS

| | | |
|---|---|---|
| 1,011,487 | Priebe | Dec. 12, 1911 |
| 1,158,727 | Sauvage | Nov. 2, 1915 |
| 1,219,014 | Lindemann | Mar. 13, 1917 |
| 1,310,872 | Mott | July 22, 1919 |
| 1,334,930 | Chadwick | Mar. 23, 1920 |
| 1,438,792 | Snyder | Dec. 12, 1922 |
| 1,711,631 | Burnett | May 7, 1929 |
| 2,019,008 | Hauser | Oct. 29, 1935 |
| 2,099,788 | Ames | Nov. 23, 1937 |
| 2,152,924 | Rutenber | Apr. 4, 1939 |
| 2,192,600 | Lurtz | Mar. 5, 1940 |
| 2,413,204 | Wolff | Dec. 24, 1946 |
| 2,491,749 | McGarry | Dec. 20, 1949 |
| 2,496,750 | Reeves | Feb. 7, 1950 |
| 2,502,685 | Warner | Apr. 4, 1950 |
| 2,742,850 | La Fond | Apr. 24, 1956 |

FOREIGN PATENTS

| | | |
|---|---|---|
| 53,243 | Netherlands | Oct. 15, 1942 |